United States Patent [19]
Tsukamoto et al.

[11] Patent Number: 6,096,988
[45] Date of Patent: Aug. 1, 2000

[54] NEUTRAL START SWITCH

[75] Inventors: Kazumasa Tsukamoto; Kozo Mandokoro; Masahiko Ando; Toshiya Morishita; Munetaka Torii, all of Anjo, Japan

[73] Assignee: Aisin AW Co., Ltd., Anjo, Japan

[21] Appl. No.: 09/149,066

[22] Filed: Sep. 8, 1998

[30] Foreign Application Priority Data

Sep. 8, 1997 [JP] Japan ................................. 9-260885

[51] Int. Cl.⁷ ................................................ H01H 21/34
[52] U.S. Cl. .......................................... 200/61.88; 200/14
[58] Field of Search ............................. 200/61.88, 61.91, 200/11 A, 14

[56] References Cited

U.S. PATENT DOCUMENTS

| | | | |
|---|---|---|---|
| 5,525,768 | 6/1996 | Cobb, III et al. | ..................... 200/61.88 |
| 5,561,416 | 10/1996 | Marchall et al. | ................ 200/61.88 X |
| 5,811,747 | 9/1998 | Taniguchi et al. | ................... 200/61.88 |

FOREIGN PATENT DOCUMENTS 6-341541  12/1994  Japan .

*Primary Examiner*—Renee S. Luebke
*Attorney, Agent, or Firm*—Oliff & Berridge, PLC

[57] ABSTRACT

A neutral start switch has a base on which stationary contacts are arranged and a rotor on which movable contacts capable of contacting the stationary contacts are disposed. The stationary contacts include reverse lamp contacts connected to a reverse lamp lighting circuit, position stationary contacts connected to a position signal circuit provided in an electronic control device, and starter stationary contacts connected to a starter motor driving circuit. The contacts are arranged so that contact portions of the movable contacts that contact the reverse lamp stationary contacts are different from contact portions of the movable contacts that contact the other stationary contacts, thereby preventing carbonized powder produced by spark at the time of the closure and opening of the reverse lamp contacts from causing a contact failure of another contact.

17 Claims, 9 Drawing Sheets

| TERMINAL | | | | | | | | | |
|---|---|---|---|---|---|---|---|---|---|
| | | STARTER CIRCUIT | | REVERSE CIRCUIT | | POSITION CIRCUIT | | | | |
| | | ST | M | D | E | G | A | B | C | PA |
| SHIFT POSITION | P | O | O | | | O | O | | | O |
| | R | | | O | O | O | O | O | | |
| | N | O | O | | | O | | | | O |
| | D | | | | | O | O | O | | |
| | 3 | | | | | O | O | O | O | O |
| | 2 | | | | | O | O | | O | |
| | L | | | | | O | | | O | O |

NEUTRAL START SWITCH

BACKGROUND OF THE INVENTION

1. Field of the Invention

The invention relates to a neutral start switch that detects a range position for the purpose of controlling an automatic transmission and opens and closes an operating circuit of a vehicle-equipped appliance in accordance with each range position.

2. Description of the Related Art

A typical automatic transmission used in a vehicle restricts the range of gear speeds achievable in accordance with a range position selected by operating a shift device, and changes the gear speed within the restricted range, in accordance with the vehicle speed and the throttle opening. For such gear speed changing control, a sensor switch for detecting the range position selected as described above is provided for the automatic transmission. The sensor switch is operated in cooperation with the shift device. The switch not only detects the range position, but also drives a starter motor and turns on a reverse lamp, both of which are vehicle-equipped appliances. The switch is generally termed a neutral start switch because when the shift device is at the neutral position, the switch closes the starter motor driving circuit and thereby allows the starter motor to be started.

The number of range positions in the automatic transmission is increasing along with the increase in the number of the gear speeds. In many of the latest automatic transmissions having five forward gear speeds, seven range positions are provided, that is, the "P" (parking) position, the "R" (reverse) position, the "N" (neutral) position, the "D" (drive) position, the "3" (third) position, the "2" (second) position and the "L" (low) position. If contacts are provided corresponding to the increased number of range positions so as to detect each range position, the neutral start switch becomes large in size, thereby degrading vehicle installability. Therefore, in a conventional neutral start switch technology as disclosed in Japanese Patent Application Laid-Open No. HEI 6-341541, the range position is determined by an electronic control unit using combinations of on-off signals in accordance with the closed and open states of four position stationary contacts (in this specification, referred to as "contact PA", "contact A", "contact B" and "contact C" to distinguish the position contacts).

In the application of this conventional technology to a neutral start switch that also opens and closes the starter motor driving circuit and the reverse lamp lighting circuit, a structure can be considered in which stationary contacts separate for each of those circuits are arranged together with the position stationary contacts along a single movable contact. However, the adoption of the common movable contact for the three different kinds of stationary contacts causes a problem due to the functional differences among them, that is, the effect of sparks caused by the closing and opening of the contacts. That is, the starter contacts do not produce sparks when closed or opened, since the closing or opening of those contacts does not involve the electrical conduction or discontinuation thereof. The position stationary contacts do not produce significant sparking since the current conducted or shut down at the time of the closing or opening of the contacts is as small as several ten milliamperes, and the voltage is also low compared with the battery voltage of 12 V. In contrast, as for the reverse lamp contact, the closing and opening thereof involves the conduction and discontinuation of electricity at the battery voltage, and the current is as large as about 5 A. Therefore, the closing and opening of the reverse lamp contact produces large sparks.

Large sparks heat and carbonize the stationary contacts. Carbon powder will be scraped off one stationary contact and transported to another stationary contact by the movable contact, thereby reducing the conductivity of the contact. Furthermore, the movable contact also undergoes spark wear so that the stability of contact with the stationary contacts is reduced. Such reduction in the conductivity and the contact stability does not become a significant problem with the reverse lamp circuit. However, with regard to the position circuit, which operates by weak currents, a reduced conductivity or a reduced contact stability increases the possibility of signal failure. With regard to the starter circuit, which operates by large currents, the possibility of a start failure due to a reduction in the starting current increases.

SUMMARY OF THE INVENTION

Accordingly, it is object of the invention to provide a neutral start switch that is able to solve the aforementioned problem resulting from sparks produced on reverse lamp contacts.

In order to prevent a contact failure due to sparks on the reverse lamp contacts, it is normal to provide movable contacts separately for contact with a reverse lamp stationary contact and contact with a stationary contact other than the reverse lamp stationary contact. However, in realization of the approach, the radial dimension of the neutral start switch normally increases due to a concentric arrangement of many stationary contacts, thereby giving rise to a problem of deterioration in vehicle installability. Therefore, it is a second object of the invention to solve the problems due to sparks produced on the reverse lamp contacts and prevent an increase in the radial dimension of the switch.

To prevent the increase in the radial dimension of the switch, an arrangement may be considered in which the position stationary contacts, which are normally provided in a relatively large number, are juxtaposed in circumferential directions. However, this arrangement normally increases the circumferential dimension of the switch. Accordingly, it is still another object of the invention to curb the increase of the circumferential dimension that normally results in an attempt to prevent an increase in the radial dimension of the neutral start switch.

In principle, the circumferential length of a position stationary contact is determined corresponding to the circumferential stroke of a movable contact on the rotor. Therefore, the circumferential length of a position stationary contact cannot be individually reduced. Accordingly, it is a further object of the invention to dispose movable contacts corresponding to adjacent position stationary contacts that are juxtaposed in a circumferential direction, close to each other in a circumferential direction, so that the moving range of the movable contacts is reduced in a circumferential direction, and to thereby curb the increase in the circumferential dimension of the switch determined by a space required for the movements of the movable contacts.

Position stationary contacts normally include a common contact and a group of ordinary position contacts. In an arrangement where the individual position contacts are paired with a single common contact, connections between movable contacts are required, thereby complicating the structure. If another arrangement is employed where the individual position contacts are paired with their respective common contacts, two stationary contact strips are normally disposed for each position contact, thereby increasing the radial dimension. Accordingly, it is a still further object of the invention to avoid a complicated structure of the side of movable contacts while minimizing the increase in the number of stationary contact strips.

It is a yet further object of the invention to reduce the size of the switch in good balance between the radial and circumferential dimensions by devising a suitable arrangement of stationary contacts in radial and circumferential directions and reducing the space required for the movements of the movable contacts.

It is a further object of the invention to reduce the size of the switch in good balance between the entire outer and inner circumferential portions by devising a suitable arrangement of stationary contacts in the radial and the circumferential directions and reducing the space required for the movement of the movable contacts.

It is a further object of the invention to provide a compact neutral start switch with good balance between the radial and circumferential dimensions around a shaft portion of the rotor by devising a suitable arrangement of stationary contacts around the rotor shaft.

It is a further object of the invention to eliminate the aforementioned problems due to sparks produced on the reverse lamp contacts while employing a structure in which a single movable contact contacts a reverse lamp stationary contact and also contacts another stationary contact.

According to the invention, there is provided a neutral start switch including stationary contacts concentrically disposed in a switch base, the stationary contacts forming pairs that have a radially inward-outward positional relationship. The stationary contacts include at least one reverse lamp stationary contact connected to a reverse lamp lighting circuit, at least one position stationary contact connected to a position signal circuit provided in an electronic control device, and at least one starter stationary contact connected to a starter motor driving circuit. The neutral start switch also includes movable contacts disposed on a rotor turnable relative to the switch base so that the movable contacts are movable concentrically and capable of contacting the stationary contacts. The contacts are arranged so that a contact portion of the movable contacts the contact the at least one reverse lamp stationary contact is different from contact portions of the movable contacts that contact the other stationary contacts.

In the neutral start switch of the invention, because the contacts are arranged so that a contact portion of the movable contacts that contacts the at least one reverse lamp stationary contact is different from contact portions of the movable contacts that contact the other stationary contacts, it is possible to prevent an event that the reverse lamp stationary contact becomes carbonized due to sparks produced at a contact portion between the stationary contact and the movable contact, and that carbonized powder is transported to a contact portion between another stationary contact and the movable contact and therefore causes a contact failure. Furthermore, although the contact portion between the reverse lamp stationary contact and the movable contact may undergo spark wear, the spark-worn portion of the movable contact does not contact another stationary contact, thereby considerably reducing the deterioration of the contact stability of the other contact portions.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described in detail hereinafter with reference to the accompanying drawings.

Figure 1:
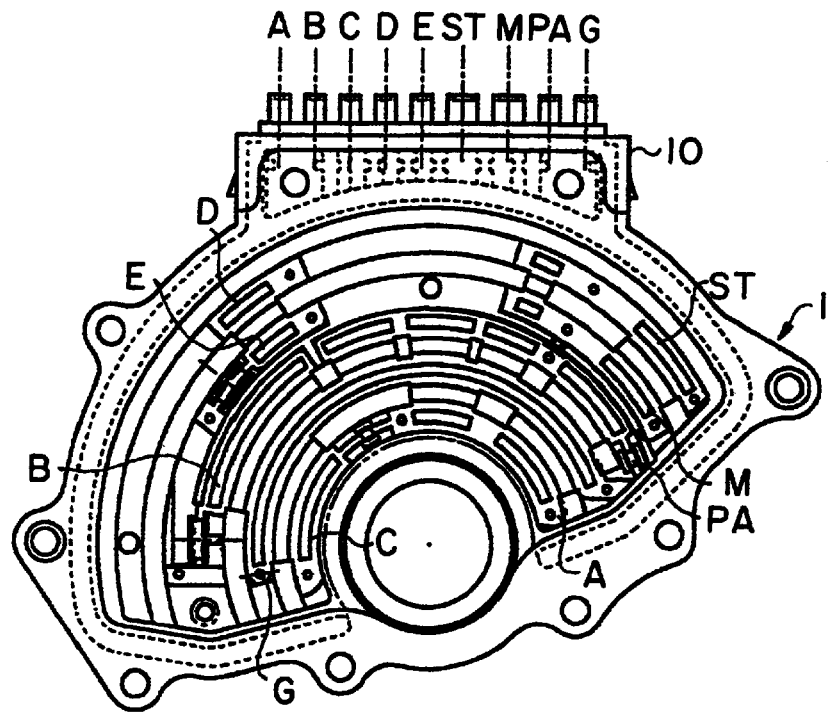
FIG. 1 is a plan view of a base of a neutral start switch according to a first preferred embodiment of the invention.
Figure 2:
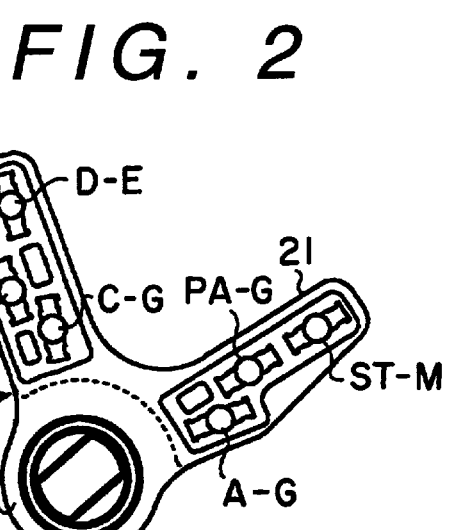
FIG. 2 is a plan view of a rotor of the neutral start switch according to the first embodiment.
Figures 3, 4:
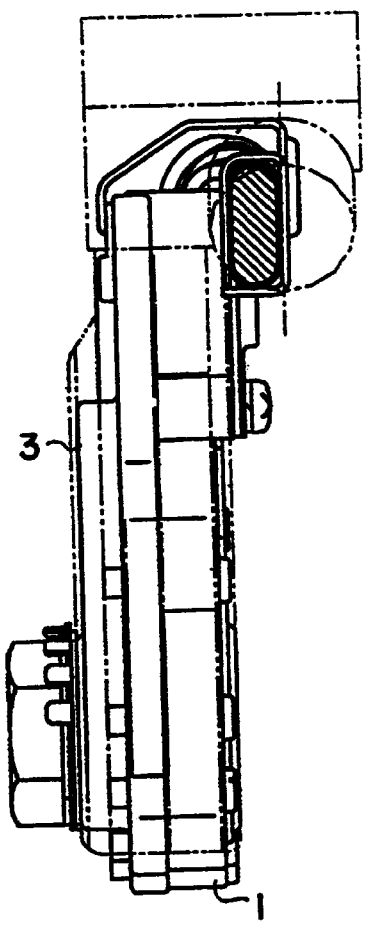
FIG. 3 is a side view of the neutral start switch.
FIG. 4 is a table showing the relationship between the shift positions and the connection and disconnection of the contact pieces corresponding to the terminals in the neutral start switch.

FIGS. 1 through 3 show a first embodiment of the neutral start switch of the invention. The neutral start switch of the first embodiment includes a plastic-made switch base 1 in which various stationary contact pieces are embedded, a rotor 2 disposed movably in the base 1 in such a manner that the rotor 2 bears a spring force and that movable contact pieces provided in the rotor 2 face the stationary contact pieces of the base 1, and a cover 3 that presses the reverse surface of the rotor 2 and covers the movable and stationary contact pieces fluid-tightly. The leads of the stationary contact pieces embedded in the base 1 extend through the interior of the base 1 to the outside thereof, and connect to various terminals of a connector 10.

As can be seen in the plan view of FIG. 1, the stationary contact pieces in the base 1 of the neutral start switch extend generally in the form of concentric arcs. More specifically, a pair of radially outer and inner stationary contact pieces ST, M are substantially aligned in the direction of a radius of the base 1, that is, in a radially inward-outward positional relationship. Also substantially radially aligned are a pair of outer and inner stationary contact pieces D, E. Furthermore, stationary contact pieces PA, A, B, C pair with a common stationary contact piece G. As shown in the plan view FIG. 2, movable contact pieces ST-M, D-E, PA-G, A-G, B-G, C-G are disposed in the rotor 2 corresponding to the stationary contact pieces in the base 1 so that as the rotor 2 is moved or turned relative to the base 1, the movable contact pieces move concentrically to close and open the corresponding stationary contact pieces. The stationary contact pieces D, E are reverse lamp stationary contact pieces connected to a reverse lamp lighting circuit. The stationary contact pieces PA, A, B, C, G are position stationary contact pieces connected to a position signal circuit provided in an electronic control unit. The stationary contact pieces ST, M are starter stationary contact pieces connected to a starter motor driving circuit.

FIG. 4 is a table showing the correspondence between the connector terminals corresponding to the stationary contact pieces and the range or shift positions that are detected by the electronic control unit on the basis of signals outputted via the terminals. In the table, the horizontally aligned characters indicate the terminals, and the vertically aligned characters and numbers indicate the shift positions. The circles "O" in the table indicate the on-status of switch signals. As can be seen from the combinations of the on-status signals to the position circuit in the table, it is possible to detect each shift position on the basis of the combination of the on-status signals caused by the connection of the terminal G with the terminals A, B, C and PA. Furthermore, when the shift position is either the "P" position or the "L" position, the terminal PA is on and the terminal B is off, as described in detail later.

The pair of the reverse lamp stationary contact pieces D, E (Hereinafter in the description of the embodiments, referred to simply as "contact piece D" and "contact piece E". The other stationary and movable contact pieces will also be referred to by similarly simplified names.) and the pair of contact pieces ST, M are disposed in a radially outermost portion of the base 1. The contact pieces PA, B are disposed radially inwardly of the contact pieces D, E, ST, M. The contact piece G is disposed radially inwardly of the contact pieces PA, B. The contact pieces A, C are disposed radially inwardly of the contact piece G. Although the contact piece PA has four contact portions that are spaced from and electrically connected to one another by embedded or gap portions, the four contact portions form a single contact piece (contact piece PA) producing one and the same position detection signal. Similarly, although the contact piece A has two contact portions that are spaced from and electrically connected to each other by an embedded or gap portion, the contact portions form a single contact piece (contact piece A) producing one and the same position detection signal.

The movable contact pieces ST-M, D-E, PA-G, A-G, B-G, C-G corresponding to the stationary contact pieces are arranged so that the movable contact pieces contact the contact pieces D, E at a position different from the positions of the contact between the other stationary contact pieces and the corresponding movable contact pieces. In this embodiment, as shown in FIG. 2, the movable contact pieces are arranged in two arms 21, 22 extending from a boss portion 20 of the rotor 2 in the form of a fork. The movable contact pieces in each arm are disposed at different radial distances from the boss portion 20, that is, at different positions in a radial direction, and they are shifted from one another in a circumferential direction, that is, shifted from alignment in the direction of a radius, in order to prevent interference between the contact pieces. That is, the contacts ST-M, PA-G, A-G are disposed in the arm 21 in that order from the distal end thereof toward the boss portion 20. The contacts D-E, B-G, C-G are disposed in the other arm 22 in that order from the distal end thereof toward the boss portion 20.

FIGS. 5 through 11 show the positional relationships between the stationary contact pieces and the movable contact pieces at the individual shift positions. When the rotor 2 is at the "P" position as indicted in FIG. 5, the position circuit assumes a connection state where the contact piece PA is connected to the contact piece G by the contact piece PA-G disposed in the first arm 21 and therefore the signal PA is at the on-status, and where the contact piece A is connected to the contact piece G by the contact piece A-G and therefore signal A is at the on-status. Based on the on-status of the two signals PA, A, the "P" position is detected. At this position, the starter circuit is closed because the contact pieces ST and M are interconnected by the contact piece ST-M. Therefore, the starter can be started by an ignition key operation. Since the starter starting current is not supplied by a position shift of the neutral start switch but by the ignition key operation, there is no possibility of an occurrence of a spark at the time of the position shift of the neutral start switch. When the neutral start switch is at the "P" position, the contact piece B-G in the second arm 22 is located over the contact piece PA and connects the contact piece PA to the contact piece G. However, this connection by the contact piece B-G does not affect the position detection since the contact piece PA and the contact piece G are also interconnected by the contact piece PA-G as described above.

Figure 6:
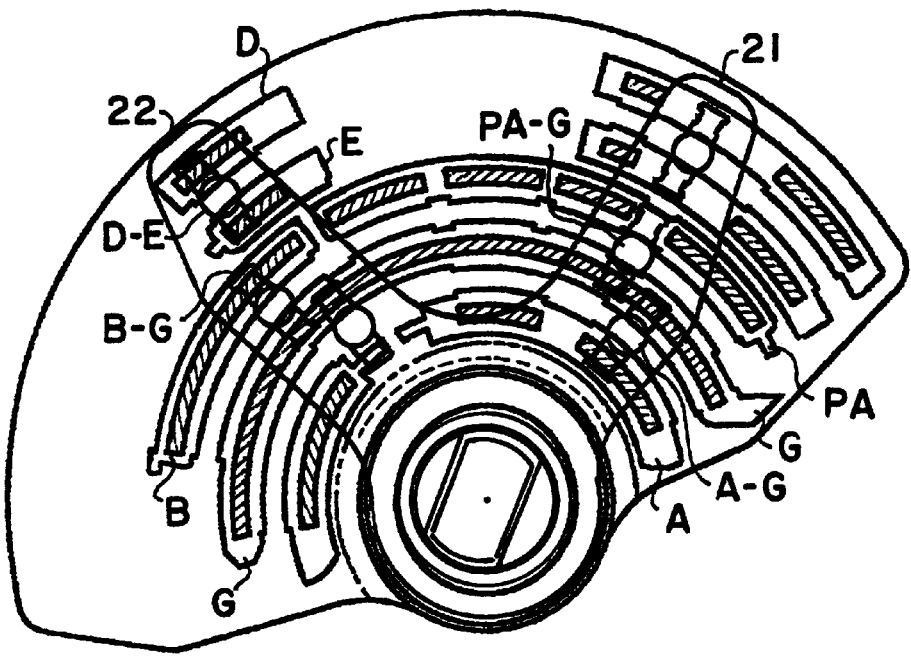
FIG. 6 illustrates the operation of the contact pieces of the neutral start switch when the switch is at the "R" position.

When the rotor 2 is then turned to the "R" position as indicated in FIG. 6, the position circuit assumes a connection state where the connection between the contact piece A and the contact piece G by the contact piece A-G of the first arm 21 is maintained so that the signal A remains at the on-status, and where the contact piece PA-G has moved to a gap portion of the contact piece PA so that signal PA is at the off-status, and where the contact piece B is connected to the contact piece G by the contact piece B-G of the second arm 22 so that the signal B is at the on-status. The starter circuit is off since the contact piece ST-M has moved to a gap portion. In the reverse lamp circuit, the contact pieces D, E are interconnected by the contact piece D-E on the second arm 22, so that the reverse lamp circuit is on and, simultaneously, the reverse lamps are turned on. Since the shift of the neutral start switch to the "R" position involves the switching-on of the lamp lighting circuit, a spark occurs at the time of the contact of the contact piece D-E with the corresponding contact pieces. When the neutral start switch is shifted from the "R" position, the current through the reverse lamp circuit is shut down, so that a large spark occurs due to impulse current.

Figure 7:
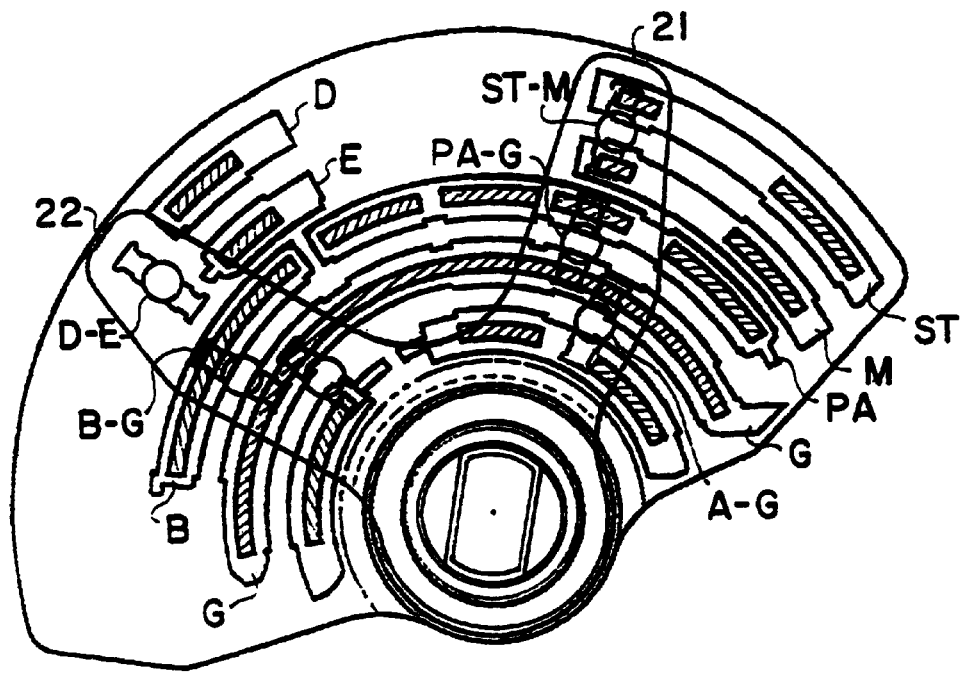
FIG. 7 illustrates the operation of the contact pieces of the neutral start switch when the switch is at the "N" position.

When the rotor 2 is turned to the "N" position as indicated in FIG. 7, the position circuit assumes a connection state where the contact piece PA is connected to the contact piece G by the contact piece PA-G of the first arm 21 so that the signal PA is switched to the on-status, and where the contact piece is moved to the gap portion of the contact piece A so that the signal A is switched to the off-status, and where the connection between the contact pieces B, G by the contact piece B-G of the second arm 22 is maintained so that the signal B remains at the on-status. The starter circuit is on because the contact pieces ST, M are interconnected by the contact piece ST-M. The reverse lamp circuit is off because the contact piece D-E has moved off the contact pieces D, E.

Figure 8:
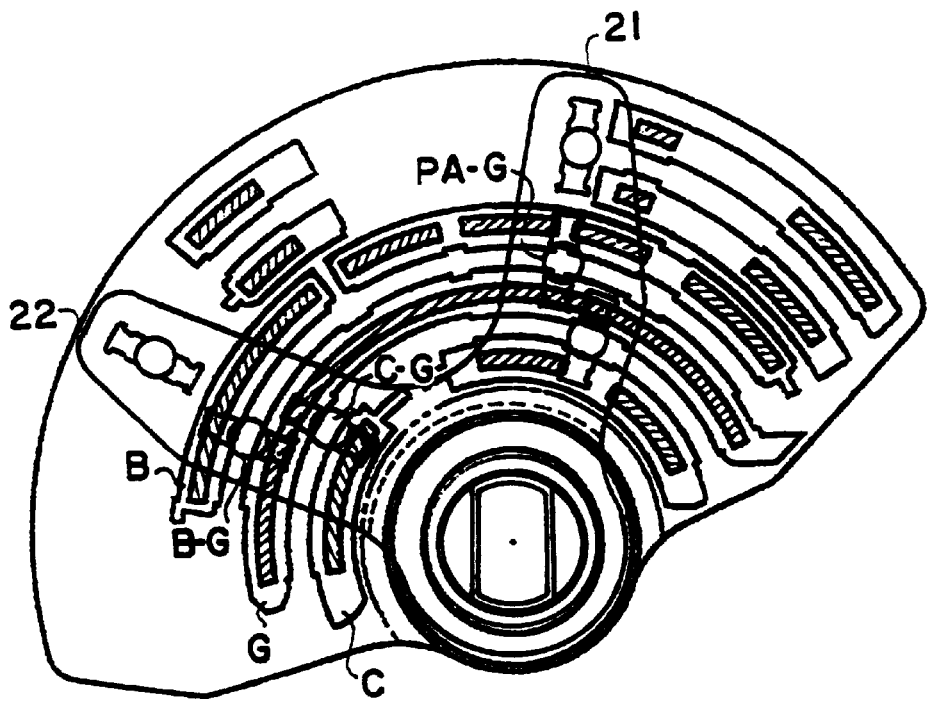
FIG. 8 illustrates the operation of the contact pieces of the neutral start switch when the switch is at the "D" position.

When the rotor 2 is turned to the "D" position as indicated in FIG. 8, the position circuit assumes a connection state where the contact piece PA-G of the first arm 21 is moved to another gap portion of the contact piece PA so that the signal PA is switched to the off-status, and where thee connection between the contact pieces B, G by the contact piece B-G of the second arm 22 is maintained so that the signal B remains at the on-status, and where the contact pieces C, G are interconnected by the contact piece C-G of the second arm 22 so that the signal C is switched to the on-status.

Figure 9:
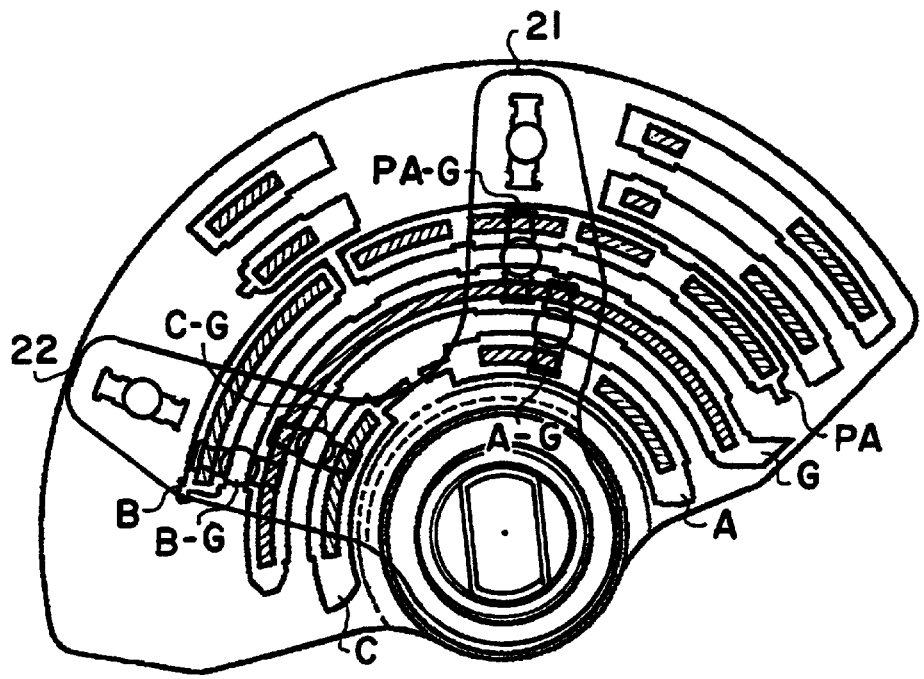
FIG. 9 illustrates the operation of the contact pieces of the neutral start switch when the switch is at the "3" position.

When the rotor 2 is turned to the "3" position as indicated in FIG. 9, the position circuit assumes a connection state where all the position contact pieces PA, A, B, C are connected to the common contact piece G by the contact pieces PA-G, A-G of the first arm 21 and the contact pieces B-G, C-G of the second arm 22 so that all the position signals PA, A, B, C are at the on-status.

Figure 10:
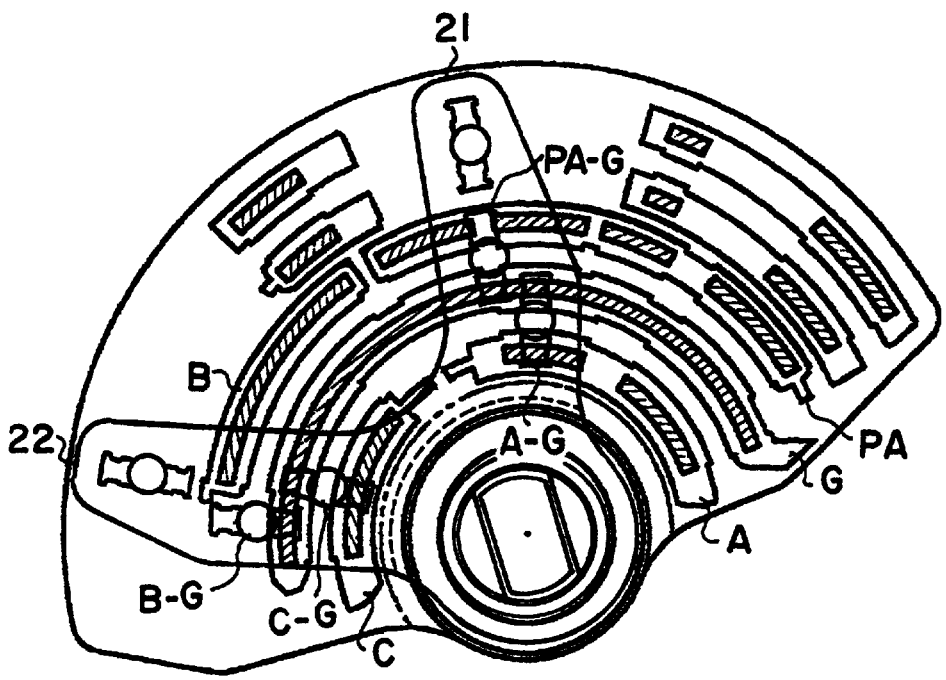
FIG. 10 illustrates the operation of the contact pieces of the neutral start switch when the switch is at the "2" position.

When the rotor 2 is turned to the "2" position as indicated in FIG. 10, the position circuit assumes a connection state where the contact piece PA-G of the first arm 21 is moved to the third gap portion of the contact piece PA so that the signal PA is switched to the off-status, and where the connection between the contact pieces A, G by the contact piece A-G of the first arm 21 is maintained so that the signal A remains at the on-status, and where the connection between the contact pieces C, G by the contact piece C-G of the second arm 22 is maintained so that the signal C remains at the on-status, and where the contact piece B-G is moved off the contact piece B so that the signal B is switched to the off-status.

Figure 11:
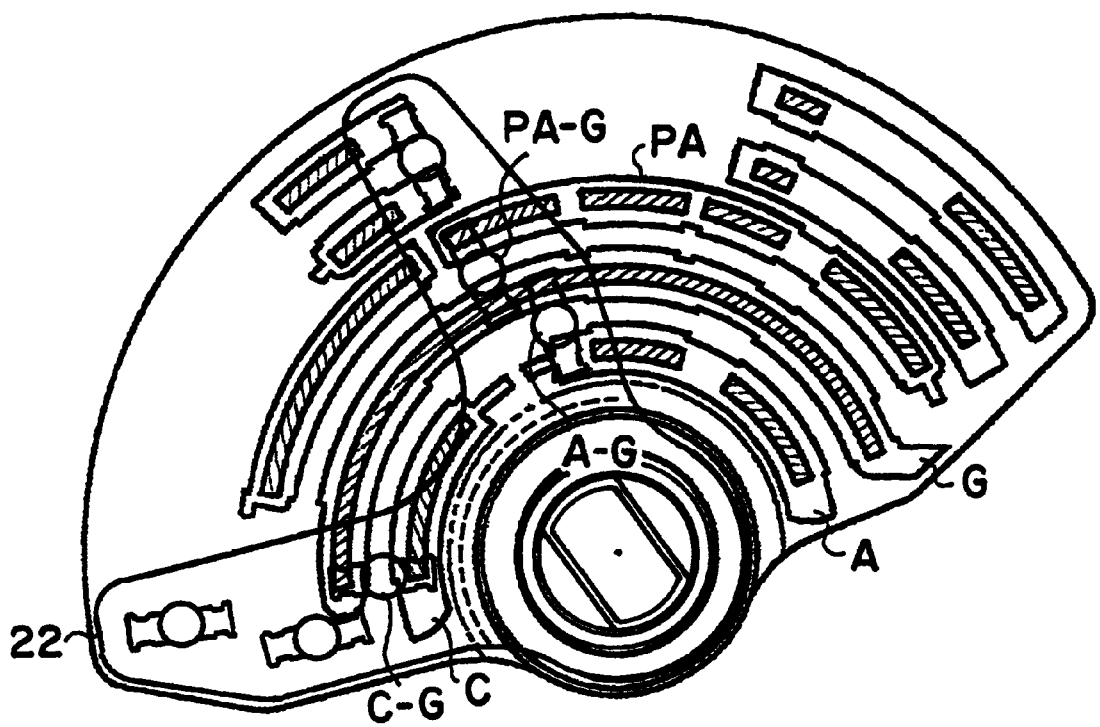
FIG. 11 illustrates the operation of the contact pieces of the neutral start switch when the switch is at the "L" position.

When the rotor 2 is turned to the "L" position as indicated in FIG. 11, the position circuit assumes a connection state where the connection between the contact pieces C, G by the contact piece C-G of the second arm 22 is maintained so that the signal C remains at the on-status, and where the contact pieces PA, G are interconnected by the contact piece PA-G of the first arm 21 so that the signal PA is switched to the on-status, and where the contact piece A-G is moved from the contact piece A so that the signal A is switched to the off-status.

Figure 5:
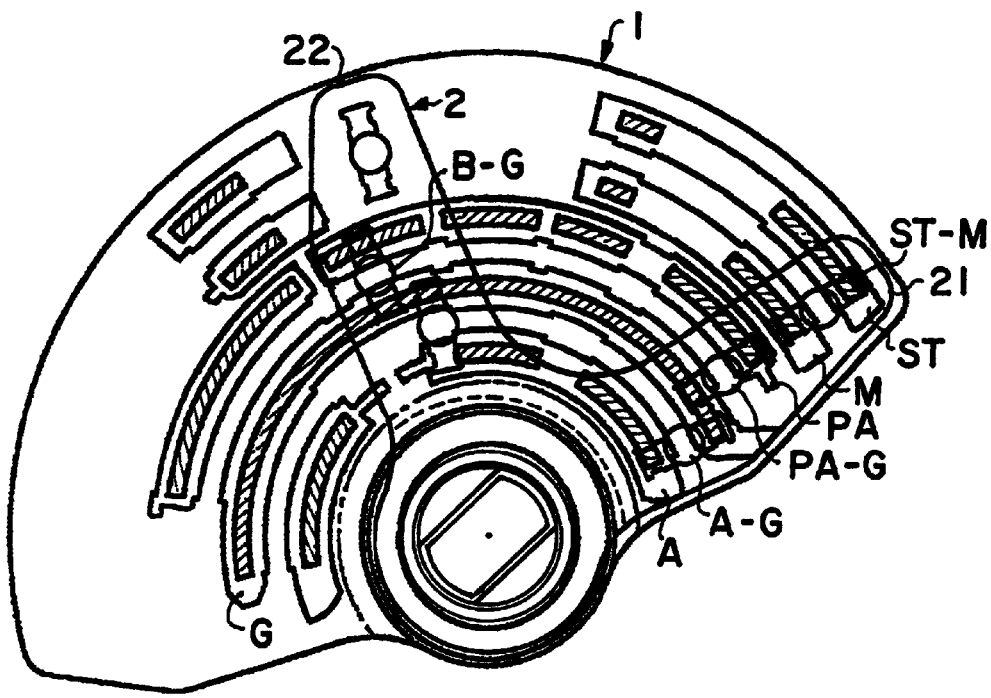
FIG. 5 illustrates the operation of the contact pieces of the neutral start switch when the switch is at the "P" position.

As can be understood from the comparison in the position of each movable contact piece between the "P" position and the "L" position indicated in FIGS. 5 and 11, if the contact piece ST-M came to or coincided with the pair of the contact pieces D, E in the course of the movement of the contact piece ST-M from the "P" position to the "L" position, the contact piece ST-M would establish a false connection to turn on the reverse lamp. Therefore, the contact piece ST-M must not reach the pair of the contact pieces D, E. That is, the pair of the contact pieces D, E must be disposed outside the moving range of the contact piece ST-M. Consequently, the attempt to dispose the pair of the contact pieces D, E closer to the pair of the contact pieces ST, M is restricted by the moving distance of the contact piece ST-M. In addition, the contact pieces D, E must contact the contact piece D-E at the "R" position. Under these circumstances, if the contact pieces are arranged so that the contact piece D-E is located closer to the contact piece PA when the rotor 2 is at the "P" position, the interval between the contact piece ST-M and the contact piece D-E in a circumferential direction is reduced. Consequently, the circumferential space for the movement of the contact pieces ST-M, D-E is correspondingly reduced, so that the circumferential dimension of the neutral start switch can be reduced.

This will be considered with regard to the stationary contact pieces. As can be understood from the comparison in the position of each movable contact piece between the "P" position and the "L" position, if the contact piece B-G corresponding to the contact pieces B, G comes into contact with the pair of the contact pieces PA, G as the contact piece B-G is moved from the "L" position to the "P" position, the on-status signal PA is produced, which normally results in a signal failure. However, in this embodiment, the contact pieces PA, G are simultaneously interconnected also by the contact piece PA-G so that the signal PA becomes correctly the on-status. Therefore, the contact between the contact piece B-G and the contact pieces PA, G does not cause a problem in formation of signal patterns in this embodiment. Using this feature, it is possible to dispose the contact piece B-G closer in a circumferential direction to the contact piece PA-G. That is, since the contact piece B-G is allowed to contact the contact piece PA at the "P" position, the contact piece B-G can be disposed closer to the contact piece PA by the amount corresponding to one interval between shift positions. Therefore, the interval between the movable contact pieces PA-G, B-G in the circumferential direction is correspondingly reduced. In other words, the circumferential space for the movement of the contact pieces PA-G, B-G is reduced, so that the circumferential dimension of the neutral start switch can be reduced.

In the first embodiment, the radial dimension of the neutral start switch is reduced by juxtaposing the stationary contact pieces PA, B at the same radial distance from the boss portion 20, that is, at the same position in a radial direction and juxtaposing the stationary contact pieces A, C at the same radial distance from the boss-receiving portion of the base 1 in such a manner that the contact pieces PA, B and the contact pieces A, C are on opposite sides of the common contact piece G. The increase of the circumferential dimension that normally occurs corresponding to the reduction of the radial dimension is reduced by the overlap between the moving ranges of the movable contact pieces. Therefore, the size of the neutral start switch is reduced as a whole. The radial dimension of the neutral start switch is reduced also by juxtaposing the reverse lamp stationary contact pieces and the starter stationary contact pieces at the same radial distance from the boss-receiving portion of the base 1.

Figure 12:
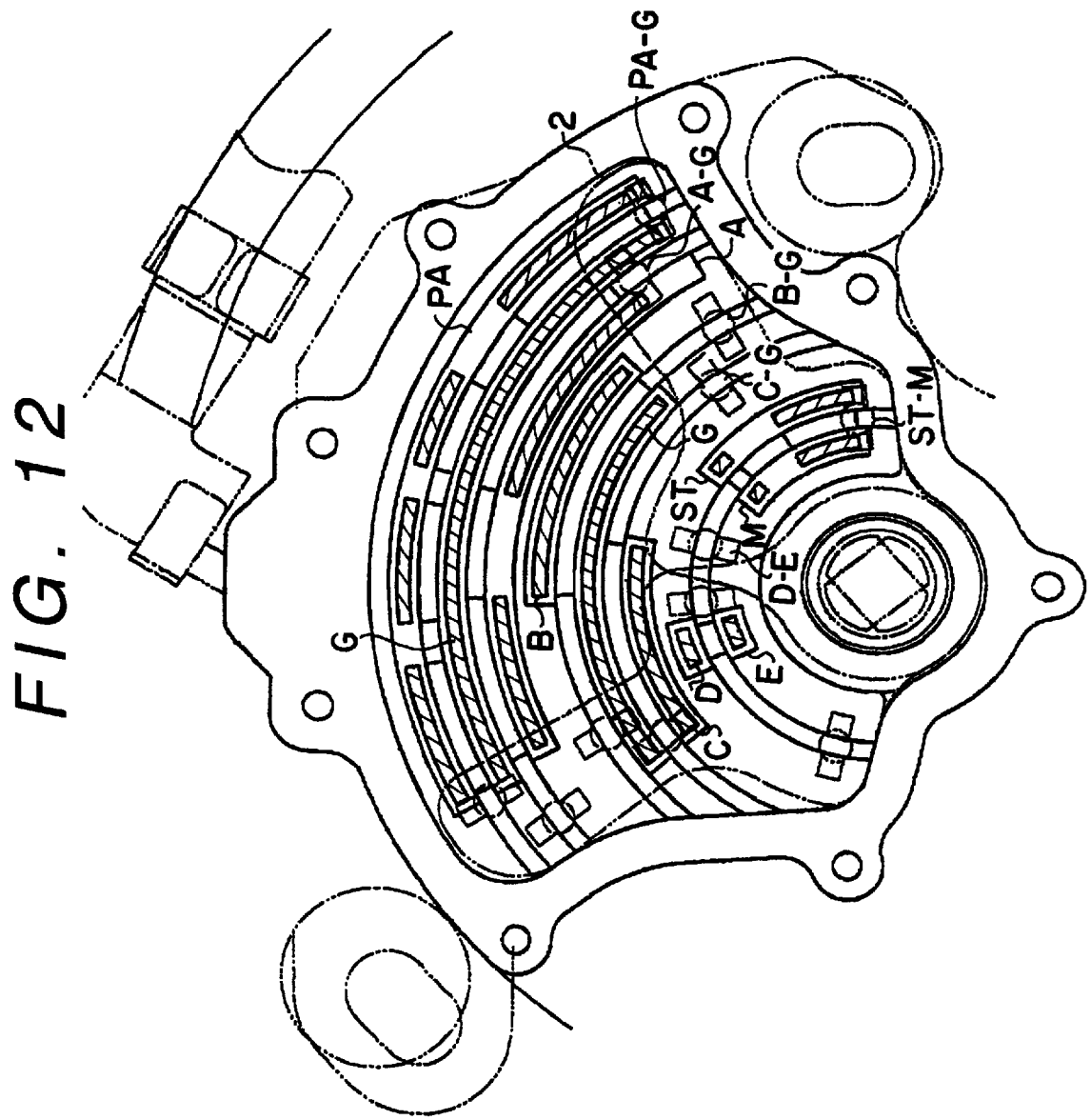
FIG. 12 is a plan view of the relationship between the switch base and the rotor according to a second embodiment of the invention.

FIG. 12 shows a second embodiment of the invention. In the second embodiment, two strips of the contact piece G of the position circuit are concentrically disposed. The position stationary contact pieces PA, A are disposed on the opposite sides of one of the two contact strips G, that is, the radially inner and outer sides thereof, and the position stationary contact pieces B, C are disposed on the radially inner and outer sides of the other contact strip G, so as to reduce the circumferential dimension of the neutral start switch. The starter stationary contact pieces ST, M and the reverse lamp stationary contact pieces D, E are disposed radially inwardly of the position stationary contact piece. The contact piece ST and the contact piece D are juxtaposed in the circumferential direction at the same radial distance from the boss-receiving portion of the base 1, and the contact piece M and the contact piece E are juxtaposed in the circumferential direction at the same radial distance from the boss-receiving portion of the base 1. Corresponding to the arrangement of the stationary contact pieces, the position movable contact pieces PA-G, A-G, B-G, C-G are substantially aligned in radial directions on the rotor 2 although they are slightly shifted from exact radial alignment in order to prevent interference between the contact pieces. The starter movable contact piece ST-M and the reverse lamp movable contact piece D-E are aligned on the rotor 2 in a circumferential direction, with a relatively large interval left therebetween. Therefore, the rotor 2 has an inverted-"T"-shaped arm as indicated by a phantom line in FIG. 12.

With this structure, the moving range of the position contact pieces PA-G, A-G, B-G, C-G is considerably reduced. Although the moving range of the starter and reverse lamp movable contact pieces ST-M, D-E disposed in a radially inward portion may increase due to their alignment in the circumferential direction, such increase in the moving range is reduced by the overlap between the moving range of the contact piece ST-M and the moving range of the contact piece D-E. Therefore, the circumferential dimension of the radially inward portion of the neutral start switch can also be reduced. Consequently, this embodiment achieves a considerable reduction of the circumferential dimension of the radially outward portion of the neutral start switch and a favorably limited circumferential dimension of the radially inward portion thereof. As a result, the neutral start switch can be reduced in size in good balance as a whole.

Figure 13:
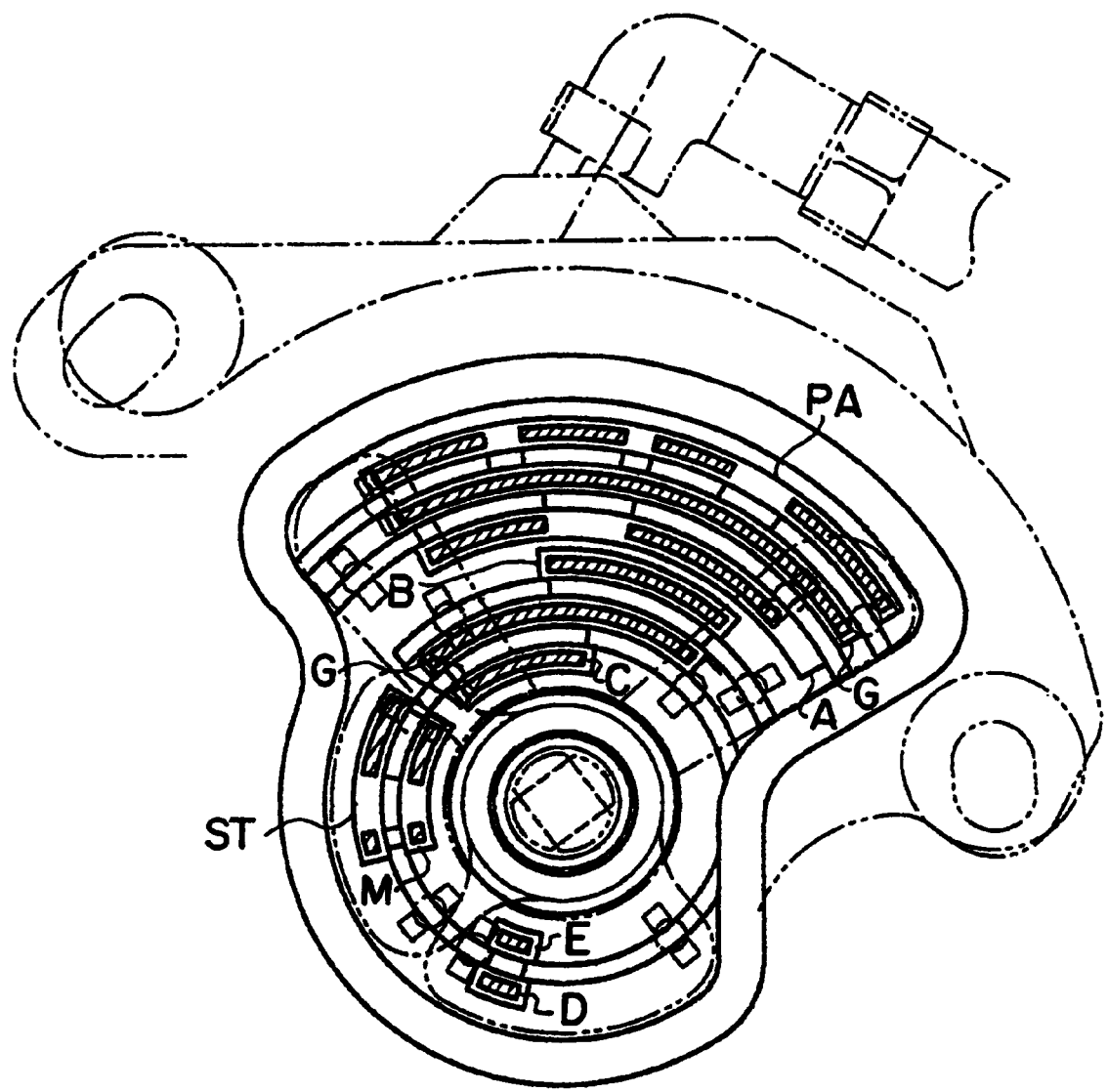
FIG. 13 is a plan view of the relationship between the switch base and the rotor according to a third embodiment of the invention.

FIG. 13 shows a third embodiment of the invention. In this embodiment, the arrangement of the stationary contact pieces of the position circuit is substantially the same as that in the second embodiment, and will not be described again. In the third embodiment, the movable contact pieces are arranged on the rotor 2 in such a manner that the starter movable contact piece ST-M and the reverse lamp movable contact piece D-E are disposed on a side of the rotating axis of the rotor opposite from a side where the position circuit movable contact pieces PA-G, A-G, B-G, C-G are disposed. The moving range of the contact piece ST-M overlaps the moving range of the contact piece D-E, thereby reducing the increase of the total moving range of the contact pieces ST-M and D-E, as in the second embodiment. Furthermore, the stationary contact pieces ST, M and the stationary contact pieces D, E are disposed at the same radial distances from the rotating axis of the rotor as the stationary contact pieces G, C, respectively. For the arrangement of thee stationary contact pieces, the arrangement of the movable contact pieces is similar to that in the second embodiment. That is, the position circuit movable contact pieces PA-G, A-G, B-G, C-G are substantially aligned in a radial direction on the rotor 2 although they are slightly shifted from exact radial alignment in order to prevent interference therebetween. The starter movable contact piece ST-M and the reverse lamp movable contact piece D-E are aligned on the rotor 2 in a circumferential direction. Therefore, the rotor 2 has an arm that is formed by a portion radially extending from the boss portion and a portion extending in a circumferential direction along the boss portion, as indicated by a phantom line in FIG. 13.

In this embodiment, a radially outward switch-operating range is reduced in a circumferential dimension, and a radially inward switch-operating range is made substantially circular. Therefore, the contact pieces are arranged around the rotating axis of the rotor 2 in a good balance. Thus, the third embodiment provides a compact neutral start switch.

Figure 14:
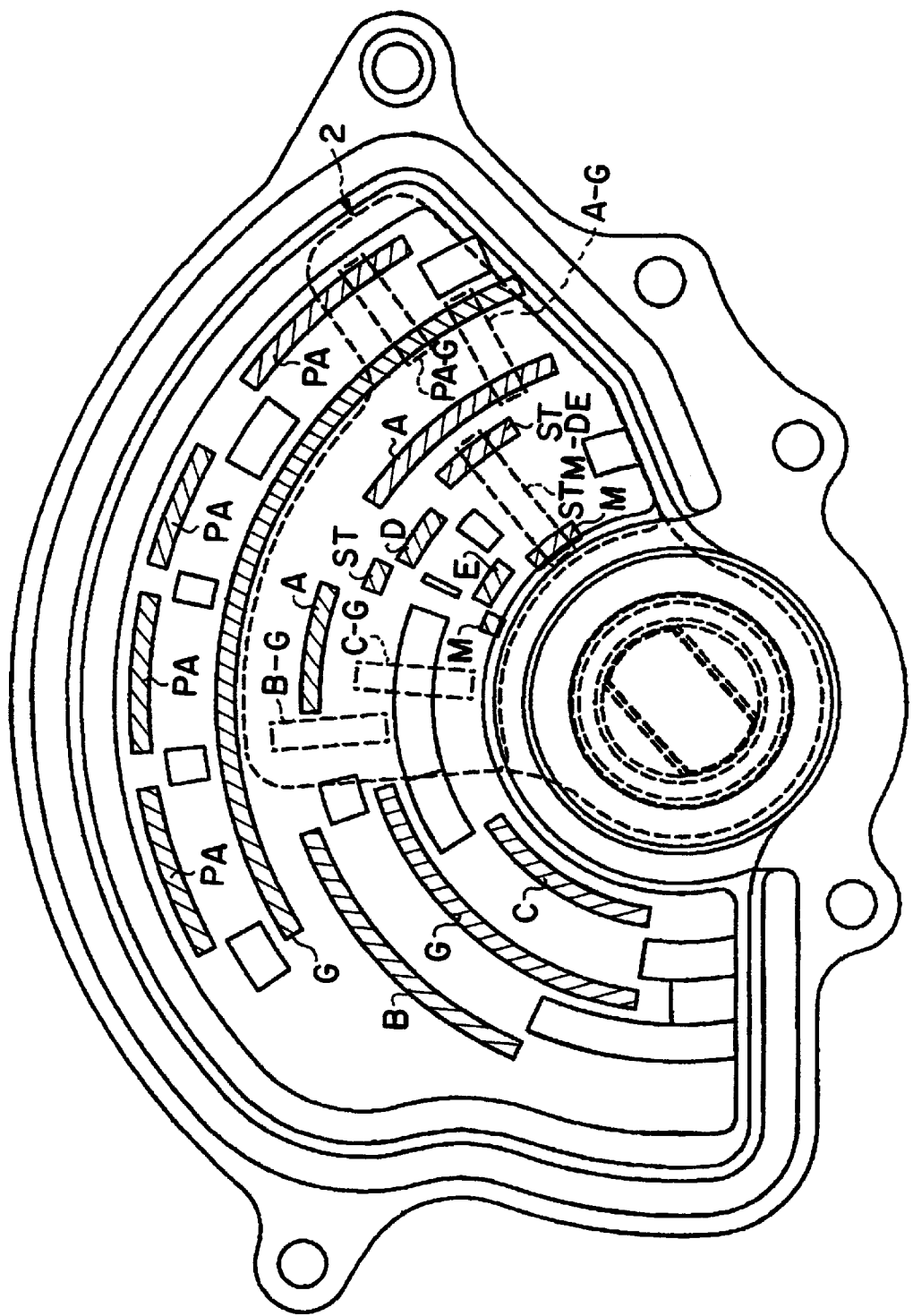
FIG. 14 is a plan view of the relationship between the switch base and the rotor according to a fourth embodiment of the invention.

FIG. 14 shows a fourth embodiment of thee invention. In this embodiment, the arrangement of the stationary contact pieces is substantially the same as that in the second embodiment, and will not be described again. In FIG. 14, the portions and components comparable to those in the second embodiment are represented by comparable reference characters. A feature of this embodiment is that the reverse lamp stationary contact pieces D, E are disposed between the starter stationary contact pieces ST, M when viewed in a circumferential direction, as in a conventional arrangement of the starter and reverse lamp contact pieces in the circumferential direction. That is, the contact pieces ST, M are disposed on the opposite sides of an imaginary circular ring portion that contains the contact pieces D, E, that is, the radially inward and outward sides of the circular ring portion. A single movable contact piece STM-DE is provided for interconnecting the stationary contact pieces ST, M and interconnecting the stationary contact pieces D, E. The radial positions of the contact of the movable contact piece STM-DE with the stationary contact pieces ST, M and with the stationary contact pieces D, E are different.

To make full use of the considerably reduced circumferential dimension of the moving range of the contact piece STM-DE in this embodiment and the feature that the contact piece A is shorter in the circumferential dimension than the contact piece PA, a sub-arrangement of the contact pieces B, C, G is juxtaposed with a sub-arrangement of the contact piece A, the contact pieces ST, M and the contact pieces D, E, in a circumferential direction, at substantially equal radial distances.

In this embodiment, since the single contact piece STM-DE contacts the pair of the contact pieces D, E and the pair of the contact pieces ST, M at different positions, the influence of a spark is limited to the portions of the contact piece STM-DE that actually contact the contact pieces D, E, that is, the spark will not affect the other contact portions or the other contact pieces. In addition, the number of component parts is also reduced. Furthermore, in this embodiment, the reverse lamp stationary contact pieces and the starter stationary contact pieces overlap in the circumferential direction as in the conventional arrangement, and the arrangement of the contact pieces is juxtaposed with the arrangement of the contact pieces B, C, G in the circumferential direction, at substantially equal radial distances. Therefore, this embodiment makes it possible to reduce the circumferential and radial dimensions off the neutral start switch while employing an arrangement off contact pieces similar to the conventional arrangement.

While the invention has been described with reference to what are presently considered to be preferred embodiments thereof, it is to be understood that the invention is not limited to the disclosed embodiments or structures. To the contrary, the invention is intended to cover various modifications and equivalent arrangements.

What is claimed is:

1. A neutral start switch, comprising:

stationary contacts concentrically disposed in a switch base, the stationary contacts forming pairs that have a radially inward-outward positional relationship, the stationary contacts including a reverse lamp stationary contact connected to a reverse lamp lighting circuit, at least one position stationary contact connected to a position signal circuit provided in an electronic control device, and at least one starter stationary contact connected to a starter motor driving circuit;

movable contacts disposed on a rotor turnable relative to the switch base so that the movable contacts are movable concentrically and capable of contacting the stationary contacts, the contacts being arranged so that a contact portion of the movable contacts that contacts the reverse lamp stationary contact is different from contact portion of the movable contacts the contact the other stationary contacts, wherein the movable contacts include a reverse lamp movable contact capable of contacting the reverse lamp stationary contact, and one other movable contact capable of contacting another stationary contact to form a pair, the reverse lamp stationary contact is juxtaposed with the another stationary contact in a circumferential direction, and the reverse lamp stationary contact is disposed outside a moving range of the one other movable contact.

2. The neutral start switch according to claim 1, wherein a moving range of the reverse lamp movable contact overlaps the moving range of the another stationary contact within such an extent that the reverse lamp movable contact remains out of contact with the another stationary contact.

3. The neutral start switch according to claim 1, wherein the at least one position stationary contact comprises at least two position stationary contacts corresponding to different position detection signals that are juxtaposed in a circumferential direction at substantially the same position in a radial direction, one position stationary contact of the at least two position stationary contacts corresponds to one position movable contact for forming a closed circuit, and another position stationary contact of the at least two position stationary contacts corresponds to another position movable contact for forming a closed circuit, and a moving range of the one position movable contact overlaps a moving range of the another position movable contact within such an extend that whether the on position stationary contact is in contact with the another position movable contact accords with whether the one position stationary contact is in contact with the one position movable contact.

4. The neutral start switch according to claim 1, wherein the another stationary contact is a starter stationary contact and includes a first pair of starter stationary contacts that contact the one other movable contact which is a starter movable contact, when the rotor is at an angular position corresponding to a parking position and a second pair of starter stationary contacts that contact the starter movable contact when the rotor is at an angular position corresponding to a neutral position, and the reverse lamp stationary contact is juxtaposed with the starter stationary contacts in a circumferential direction at substantially the same position in a radial direction, and the reverse lamp stationary contact is disposed outside a moving range of the starter movable contact, at a position such that when the rotor is at an angular position corresponding to a reverse range position, the reverse lamp stationary contact contacts a reverse lamp movable contact, wherein a first position movable contact is provided for contacting a first stationary contact that provides a parking position detection signal upon forming a closed circuit, and a second position movable contact is provided for contacting a second stationary contact that, upon forming a closed circuit, provides a range position detection signal different from the parking position detection signal, and the first position movable contact and the second position movable contact are disposed in such a relative positional relationship that when the first position movable contact is moved to a position at which the first movable contact contacts the first stationary contact, the second position movable contact is moved to a position at which the second position movable contact contacts the first stationary contact.

5. The neutral start switch according to claim 1, wherein the at least one position stationary contact includes a common contact and a group of position contacts, and the position contacts of the group are disposed concentrically at a radially outward side and a radially inward side of the common contact so that the common contact is sandwiched by the position contacts.

6. The neutral start switch according to claim 1, wherein the at least one position stationary contact includes a plurality off pairs of position stationary contacts that provide respectively different position detection signals upon forming respective closed circuits, the pairs of position stationary contacts are juxtaposed with each other at substantially the same position in a radial direction, and the at least one starter stationary contact and the reverse lamp stationary contact are juxtaposed with each other in a circumferential direction, so as to extend concentrically with and radially outwardly of the position stationary contacts.

7. The neutral start switch according to claim 1, wherein the at least one position stationary contact includes a plurality of position stationary contacts that provide respectively different position detection signals upon forming respective closed circuits, the position stationary contacts are arranged concentrically at respectively different positions in a radial direction, and the at least one starter stationary contact and the reverse lamp stationary contact are juxtaposed with each other in a circumferential direction, so as to extend concentrically with and radially inwardly of the position stationary contacts.

8. The neutral start switch according to claim 1, wherein the at least one starter stationary contact and the reverse lamp stationary contact are disposed at a side of a rotating axis of the rotor, the side being opposite from a side where the at least one position stationary contact is disposed.

9. A neutral start switch, comprising:
a switch base;
a rotor rotatably mounted to the switch base;
a plurality of stationary position contacts circumferentially arrayed on the switch base at varying radial distances from a rotation position of the rotatably mounted rotor;
a plurality of movable contacts mounted to the rotor to oppose and selectively contact appropriate stationary position contacts of the plurality of stationary position contacts, wherein the plurality of stationary position contacts including starter contacts and rear lamp contacts and the plurality of movable contacts includes at least one movable contact for creating respective closed circuits with the starter contacts and the rear lamp contacts, the starter contacts and the rear lamp contacts contacting the at least one movable contact at different contact points, wherein the rotor has two arms, a first movable contact on a first arm contacting the starter contacts and a second movable contact on a second arm contacting the rear lamp contacts.

10. The neutral start switch according to claim 9, wherein the starter contacts comprise two pairs of separated stationary contacts and the rear lamp contacts comprise a pair of stationary contacts, a first stationary contact of each pair of stationary contacts at a first radial position from the rotation position of the rotor and a second contact of each pair of stationary contacts at a lesser radial distance, each pair of stationary contacts lying on a different radius.

11. A neutral start switch, comprising:
a switch base;
a rotor rotatably mounted to the switch base;
a plurality of stationary position contact circumferentially arrayed on the switch base at varying radial distances from a rotation position of the rotatably mounted rotor;
a plurality of movable contacts mounted to the rotor to oppose and selectively contact appropriate stationary position contacts of the plurality of stationary position contacts, wherein the plurality of stationary position contacts including starter contacts and rear lamp contacts and the plurality of movable contacts includes at least one movable contact for creating respective closed circuits with the starter contacts and the rear lamp contacts, the starter contacts and the rear lamp contacts contacting the at least one movable contact at different contact points, wherein said rotor has a single arm, a circumferentially widened portion adjacent the rotation position of the rotor mounting a pair of spaced apart movable contacts, the pair of movable contacts at a same radial distance from the rotation position.

12. The neutral start switch according to claim 11, wherein the starter contacts comprise two pairs of separated stationary contacts and the rear lamp contacts comprise a pair of stationary contacts, a first stationary contact of each pair of stationary contacts at a first radial position from the rotation position of the rotor and a second contact of each pair of stationary contacts at a lesser radial distance, each pair of stationary contacts lying on a different radius.

13. A neutral start switch, comprising:

a switch base;

a rotor rotatably mounted to the switch base;

a plurality of stationary position contacts circumferentially arrayed on the switch base at varying radial distances from a rotation position of the rotatably mounted rotor;

a plurality of movable contacts mounted to the rotor to oppose and selectively contact appropriate stationary position contacts of the plurality of stationary position contacts, wherein the plurality of stationary position contacts including starter contacts and rear lamp contacts and the plurality of movable contacts includes at least one movable contact for creating respective closed circuits with the starter contacts and the rear lamp contacts, the starter contacts and the rear lamp contacts contacting the at least one movable contact at different contact points, wherein the rotor has a pair of arms extending from the rotation position of the rotor in substantially opposite directions, wherein one arm of the two arms is circumferentially widened relative to the other arm, the circumferentially widened arm of the rotor mounting a pair of spaced apart movable contacts, the pair of movable contacts at a same radial distance from the rotation position.

14. The neutral start switch according to claim 13, wherein the starter contacts comprise two pairs of separated stationary contacts and the rear lamp contacts comprise a pair of stationary contacts, a first stationary contact of each pair of stationary contacts at a first radial position from the rotation position of the rotor and a second contact of each pair of stationary contacts at a lesser radial distance, each pair of stationary contacts lying on a different radius.

15. A neutral start switch, comprising:

a switch base;

a rotor rotatably mounted to the switch base;

a plurality of stationary position contacts circumferentially arrayed on the switch base at varying radial distances from a rotation position of the rotatably mounted rotor;

a plurality of movable contacts mounted to the rotor to oppose and selectively contact appropriate stationary position contacts of the plurality of stationary position contacts, wherein the plurality of stationary position contacts including starter contacts and rear lamp contacts and the plurality of movable contacts includes at least one movable contact for creating respective closed circuits with the starter contacts and the rear lamp contacts, the starter contacts and the rear lamp contacts contacting the at least one movable contact at different contact points, wherein the rotor has a single arm extending from the rotation position of the rotor, the rotor having a single movable contact mounted thereto for contacting the starter contact and the rear lamp contacts.

16. The neutral start switch according to claim 15, wherein the starter contacts comprise two pairs of separated stationary contacts and the rear lamp contacts comprise a pair of stationary contacts, the rear lamp contacts positioned circumferentially between the two pairs of stationary contacts making up the starter contacts.

17. The neutral start switch according to claim 16, where a first stationary contact of each pair of starter contacts is at a first radial distance from the rotation position of the rotor, a second stationary contact of each pair of starter contacts is at a second radial distance, a first stationary contact of the pair of rear lamp contacts is at a third radial distance, and a second stationary contact of the pair of rear lamp contacts at a fourth radial distance, each pair of stationary contacts being on a different radius and the first through fourth radial distances unequal to one another with no overlap.

\* \* \* \* \*